United States Patent
Hasebe

(10) Patent No.: US 7,370,880 B2
(45) Date of Patent: May 13, 2008

(54) AIRBAG APPARATUS AND METHOD OF FOLDING AIRBAG

(75) Inventor: Masahiro Hasebe, Hikone (JP)

(73) Assignee: Takata Corporation, Tokyo (JP)

( * ) Notice: Subject to any disclaimer, the term of this patent is extended or adjusted under 35 U.S.C. 154(b) by 410 days.

(21) Appl. No.: 11/085,056

(22) Filed: Mar. 22, 2005

(65) Prior Publication Data

US 2005/0212275 A1  Sep. 29, 2005

(30) Foreign Application Priority Data

Mar. 23, 2004 (JP) ............... 2004-085330
Nov. 16, 2004 (JP) ............... 2004-332105

(51) Int. Cl.
*B60R 21/16* (2006.01)
*B60R 21/233* (2006.01)

(52) U.S. Cl. ................... 280/729; 280/743.1

(58) Field of Classification Search ............ 280/743.1, 280/729

See application file for complete search history.

(56) References Cited

U.S. PATENT DOCUMENTS

| | | | |
|---|---|---|---|
| 5,213,361 A | 5/1993 | Satoh et al. | |
| 5,493,846 A | 2/1996 | Baker et al. | |
| 6,585,292 B2* | 7/2003 | Abe et al. | 280/743.1 |
| 6,834,886 B2* | 12/2004 | Hasebe et al. | 280/743.1 |
| 7,000,943 B2 | 2/2006 | Hasebe et al. | |
| 2003/0218325 A1 | 11/2003 | Hasebe et al. | |
| 2003/0230883 A1 | 12/2003 | Heym | |
| 2004/0195807 A1 | 10/2004 | Hasebe et al. | |
| 2006/0028009 A1 | 2/2006 | Hasebe et al. | |

FOREIGN PATENT DOCUMENTS

| | | |
|---|---|---|
| EP | 1 364 838 A2 | 11/2003 |
| EP | 1 452 403 A1 | 9/2004 |
| JP | 49-23176 B | 3/1974 |
| JP | 4-292239 | 10/1992 |
| JP | 04292239 A | 10/1992 |
| JP | 10-071911 | 3/1998 |
| JP | 2000289554 A | 10/2000 |
| JP | 2001030863 A | 2/2001 |

\* cited by examiner

*Primary Examiner*—Ruth Ilan
(74) *Attorney, Agent, or Firm*—Foley & Lardner LLP

(57) ABSTRACT

An airbag apparatus receives an occupant's left breast by an expanded left airbag section and receives the right breast by a right airbag section. A void space of the expanded airbag opposes the lateral center of the occupant's breast. Both the left and right airbag sections expand smoothly and substantially evenly. The left and right airbag sections are folded firstly to obtain a first folded body elongated in the fore-and-aft direction and, subsequently, the distal sides from a joint belt, which connect the midsections in the expanding direction of the left and right airbag sections, are opened laterally apart from each other. The rear sides from the joint belt are folded so as to be reduced in width in the fore-and aft direction to obtain the second folded body, and then the lateral width is reduced by the third folding operation to obtain the final folded body.

7 Claims, 16 Drawing Sheets

AIRBAG APPARATUS AND METHOD OF FOLDING AIRBAG

BACKGROUND

The present invention relates generally to an airbag apparatus provided with an airbag that is expanded upon collision of a vehicle for protecting an occupant and, more specifically, to an airbag apparatus provided with an airbag including a left airbag section and a right airbag section which are expanded separately on the left and right sides in front of the occupant. The present invention also relates to a method of folding an airbag.

As an airbag for protecting an occupant upon collision of a vehicle or the like, an airbag having a left airbag section and a right airbag section that are expanded separately on the left and right sides in front of an occupant and are expanded by a common inflator is disclosed in Japanese Unexamined Patent Application Publication No. 4-292239 (incorporated by reference herein in its entirety). In the airbag of the same publication, the distal ends of the left airbag section and the right airbag section are connected by a tie panel.

This airbag is folded and stored in a case, and wrapped by a cover. When the inflator (gas generator) is activated and injects gas upon collision of the vehicle, the airbag is expanded in front of the occupant while pushing and opening the cover.

This inflator is disposed inside or outside of the airbag on the proximal side. In the airbag apparatus having a structure in which the inflator is disposed outside the airbag on the proximal side, injected gas of the inflator is supplied to the airbag via a gas inlet port provided on the proximal side of the airbag.

When arranging the inflator inside the airbag on the proximal side, the entire inflator may be arranged inside the airbag, or part of the inflator may be arranged inside the airbag. As an example of the latter case, there is a structure in which the airbag is formed with a pair of slit-shaped openings, a rod-shaped inflator is inserted into the slit-shaped openings, and both ends of the inflator are projected outside the airbag.

In the airbag disclosed in the above-described Japanese Unexamined Patent Application Publication No. 4-292239, since the distal ends of the left airbag section and the right airbag section are connected by the tie-panel, when the airbag is expanded, the tie panel receives the lateral center of the occupant's body.

In the airbag disclosed in the above-described Japanese Unexamined Patent Application Publication No. 4-292239, when the left airbag section and the right airbag section are expanded, gas from the inflator may flow more into one of the airbags, whereby expansion of the other airbag may be delayed in comparison with the one airbag.

In the airbag of the same patent publication, since the left airbag section and the right airbag section are connected by the tie panel, even when expansion of one of the airbags is delayed, it is expected that the previously expanded airbag pulls the airbag whose expansion is delayed in the direction of expansion via the tie panel and promotes its expansion. However, since the left airbag section and the right airbag section are connected to each other at the distal ends thereof, the previously expanded airbag cannot pull the airbag whose expansion is delayed via the tie panel sufficiently until the previously expanded airbag is expanded to the distal end.

In the airbag having the left airbag section and the right airbag section as disclosed in the above-described Japanese Unexamined Patent Application Publication No. 4-292239, if the capacities of the left airbag section and the right airbag section after expansion are significant, an inflator having a large capacity is required for inflating the airbag quickly.

SUMMARY

According to one embodiment of the present invention, an airbag apparatus is provided. The airbag apparatus comprises a folded airbag and an inflator configured to expand the airbag in which the distal side of the airbag is expanded in the direction away from the proximal side by injected gas from the inflator disposed on the proximal side of the airbag, the airbag including a left airbag section which expands on the left side in front of the occupant and a right airbag section which expands on the right side in front of the occupant. The left airbag section and the right airbag section are not connected at the distal ends thereof, thereby defining a void space which is opened toward the occupant between the distal ends of the left airbag section and the right airbag section in the expanded state. The midsection of the left airbag section and the right airbag section in the direction of expansion are connected. The left airbag section and the right airbag section are respectively formed into a first folded body elongated in the fore-and-aft direction by a first folding step, then into a second folded body by the steps of moving the portions of the left airbag section and the right airbag section on the distal sides from the joint portion away from each other and folding the rear sides from the joint portion so as to be narrowed in width in the for-and-aft direction, and subsequently, into a final folded body by reducing the lateral width by a third folding step.

According to another embodiment of the present invention, a method of folding an airbag into an elongated folded body is provided. The method comprises placing an elongated plate on the airbag and folding the airbag by a plurality of times in the direction of winding the airbag along the long side of the plate and pulling out the plate from the folding body.

According to another embodiment of the present invention, an airbag apparatus is provided. The airbag apparatus comprises an airbag with a left section and a right section and an inflator for inflating the airbag. At a distal end of the airbag, the left section and the right section are spaced apart, and at a midsection of the airbag, the left section is connected to the right section.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
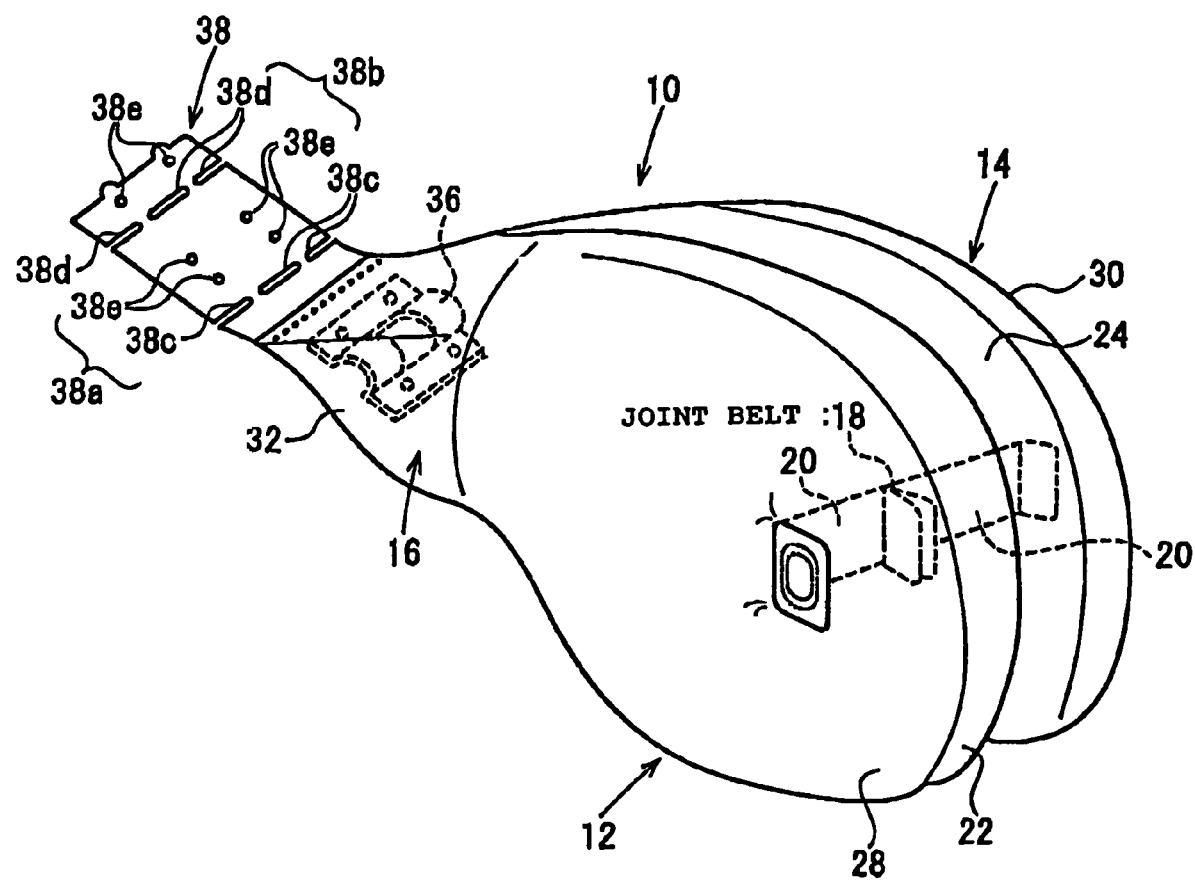
FIG. 1 is a perspective view of an airbag apparatus according to an embodiment of the present invention.

An airbag apparatus according to an embodiment of the present invention includes a folded airbag and an inflator for inflating the airbag in which the distal side of the airbag is expanded in the direction away from the proximal side by injected gas from the inflator disposed on the proximal side of the airbag, the airbag including a left airbag section which expands on the left side in front of the occupant and a right airbag section which expands on the right side in front of the occupant, wherein the left airbag section and the right airbag section are not connected at the distal ends thereof, thereby defining a void section which is opened toward the occupant between the distal ends of the left airbag section and the right airbag section in the expanded state, in that the midsection of the left airbag section and the right airbag section in the direction of expansion are connected, and in that the left airbag section and the right airbag section are respectively formed into a first folded body elongated in the fore-and-aft direction by a first folding step, then into a second folded body by the steps of moving the portions of the left airbag section and the right airbag section on the distal sides from the joint portion away from each other and folding the rear sides from the joint portion so as to be narrowed in width in the fore-and-aft direction, and subsequently, into a final folded body by reducing the lateral width by a third folding step.

The airbag apparatus according to another embodiment can have the midsections of the left airbag section and the right airbag section in the vertical direction connected to each other.

The airbag apparatus according to another embodiment can have the upper portions and the lower portions of the left airbag section and the right airbag section connected respectively.

In another embodiment, part of the second folded body is wrapped by a protector cloth.

In yet another embodiment, part of the final folded body is wrapped by a protector cloth.

According to another embodiment of the present invention, the protector cloth that wraps the second folded body and the protector cloth that wraps the final folded body are continuously formed.

According to another embodiment of the present invention, suspending belts are extended between panels constituting right and left walls of the respective left airbag section and right airbag section for limiting the lateral widths in the expanded state.

In another embodiment, a method of folding an airbag includes folding the airbag to obtain the first folded body of the airbag in the airbag apparatus in a previous embodiment, including the steps of placing an elongated plate on the outer surface of the left airbag section or the right airbag section so as to be extended in the fore-and-aft direction of the airbag, folding the left airbag section and the right airbag section by a plurality of times in a direction of winding the airbag along the long sides of the plate to obtain the first folded body, and pulling the plate out from the first folding body.

According to another embodiment, a method includes folding the airbag for folding the airbag into an elongated folded body including the steps of placing an elongated plate on the airbag and folding the airbag by a plurality of times in the direction of winding the airbag along the longer side of the plate, and pulling out the plate from the folded body.

In the airbag apparatus of an embodiment of the present invention, when the inflator is activated and the airbag is expanded, the left airbag section receives the occupant's left breast, and the right airbag section receives the occupant's right breast. In the left and right breasts, there exist hard and strong rib bones. The airbag receives and absorbs an impact of the occupant via the rib bones. The airbag includes a void space between the distal ends of the left airbag section and the right airbag section in the expanded state, and the portion in the vicinity of the breast bone at the center of the occupant's breast opposes to the void space. Therefore, when the occupant's body crashes into the airbag, the portion in the vicinity of the breast bone does not receive too strong reaction force from the airbag, whereby burden of the portion in the vicinity of the breast bone is reduced.

In the present embodiment, in a state in which the airbag is expanded, when the distance between the extremities of the left airbag section and the right airbag section is in the range of 150-450 mm, the expanded left airbag section exactly opposes the portion in the vicinity of the center of the occupant's left breast, and the right airbag section exactly opposes the portion in the vicinity of the center of the occupant's right breast, whereby the portion in the vicinity of the rib bones on the upper half of the occupant's body can be reliably received by the airbag.

In the airbag apparatus according to an embodiment of the present invention, the left airbag section and the right airbag section are respectively formed into a first folded body which is elongated in the fore-and-aft direction, then is formed into the second folded body by moving the distal sides in the expanding direction from the joint portion between the left airbag section and the right airbag section away from each other and folding the rear side from the joint portion so as to be narrowed in width in the fore-and-aft direction, and then into the final folded body by reducing the lateral width by the third folding step.

Therefore, in the airbag apparatus of an embodiment, when the airbag starts expansion, the third fold is released first to allow the left airbag section and the right airbag section to be deployed in the lateral direction in a relatively early stage, and then, the second fold is released to allow the airbag to expand toward the occupant.

In this manner, by deploying the left airbag section and the right airbag section in the lateral direction relatively early stage, gas is supplied to both the left airbag section and the right airbag section substantially evenly, whereby the left airbag section and the right airbag section can expand smoothly and substantially evenly from the initial stage of expansion. A surface which first comes into contact with the occupant (a first contact area) is formed widely in the lateral direction. Further, the left airbag section and the right airbag section are prevented from excessively projecting toward the occupant in the initial stage of expansion.

When the left airbag section and the right airbag section expand, the distal sides from the joint portion at the midsection in the direction of expansion rotate and approach toward each other from the state of being bent and opened widely so as to be apart from each other. Therefore, the left airbag section approaches the left breast as if it wraps around the occupant's left breast from the left front, and the right airbag section approaches the right breast as if it wraps around the occupant's right breast from the right front. Consequently, the occupant's head is received by the airbag as if it is embraced from the front of the left and right sides.

In the airbag apparatus of an embodiment of the present invention, since the left airbag section and the right airbag section are connected at the midsection in the direction of expansion, the expanded left airbag section and right airbag section are prevented from coming away from each other, and hence the occupant is reliably received by the left airbag section and right airbag section.

The left airbag section and the right airbag section may be connected at the midsection in the direction of expansion and the midsection in the vertical direction, and may be connected at the midsection in the direction of expansion and the upper and lower portions respectively to each other.

In the former case, the number of connected points is small and hence the airbag can be manufactured easily.

In the latter case, the distance between the upper portions and between the lower portions of the expanded left airbag section and the right airbag section may be reduced.

In the airbag apparatus according to another embodiment, since the second folded body of the airbag is wrapped by the protector cloth, the airbag is retained in the second folded shape, and the following final folding work can be achieved easily. Also, when the airbag is expanded, the airbag is deployed smoothly to the second folded shape, and hence deployment of the airbag in the lateral direction can be achieved further quickly.

In another embodiment, since the final folded body of the airbag is wrapped by the protector cloth, the airbag is retained in the final folded shape and hence the operation such as assembly to the airbag apparatus can be performed easily.

In another embodiment, since the protector cloth for wrapping the second folded body and the protector cloth for wrapping the final folded body of the airbag is continuously formed, a series of operation including the steps of folding the airbag secondly, wrapping the second folded body by the protector cloth, folding the airbag finally (third fold), and wrapping the final folded body of the airbag with the protector cloth can be performed efficiently.

According to another embodiment of the present invention, since the lateral width of the left airbag section and the right airbag section is limited by the suspending belts connected between the left and right side surfaces of the left airbag section and the right airbag section respectively, even when the inflator of small capacity is employed, the left airbag section and the right airbag section can be expanded sufficiently at an early stage. The widths of the left airbag section and the right airbag section can be adjusted to the desired values by adjusting the lengths of the suspending belts.

According to the method of folding an airbag according to an embodiment, since the elongated plate is used for assisting the folding operation, the left airbag section and the right airbag section can be easily formed into the first folded bodies having prescribed narrow widths respectively.

The method of folding the airbag using the plate for assisting the folding operation is not limited to the application for the left airbag section and the right airbag section, but can be applied to various types of airbags for folding into an elongated shape.

Referring now to the drawings, embodiments of the present invention will be described.

Figure 2:
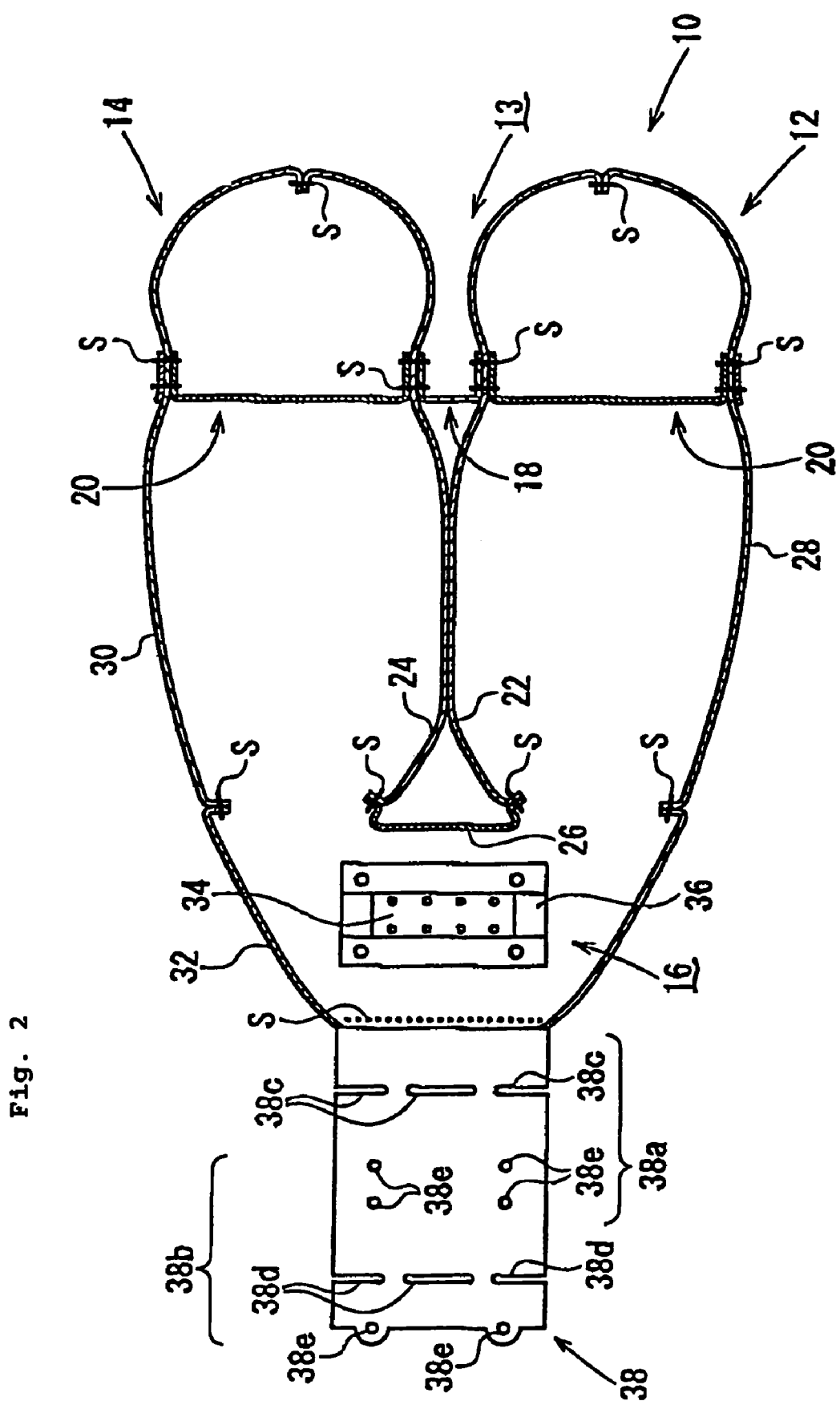
FIG. 2 is a horizontal cross-sectional view of the airbag apparatus shown in FIG. 1.
Figure 9A:
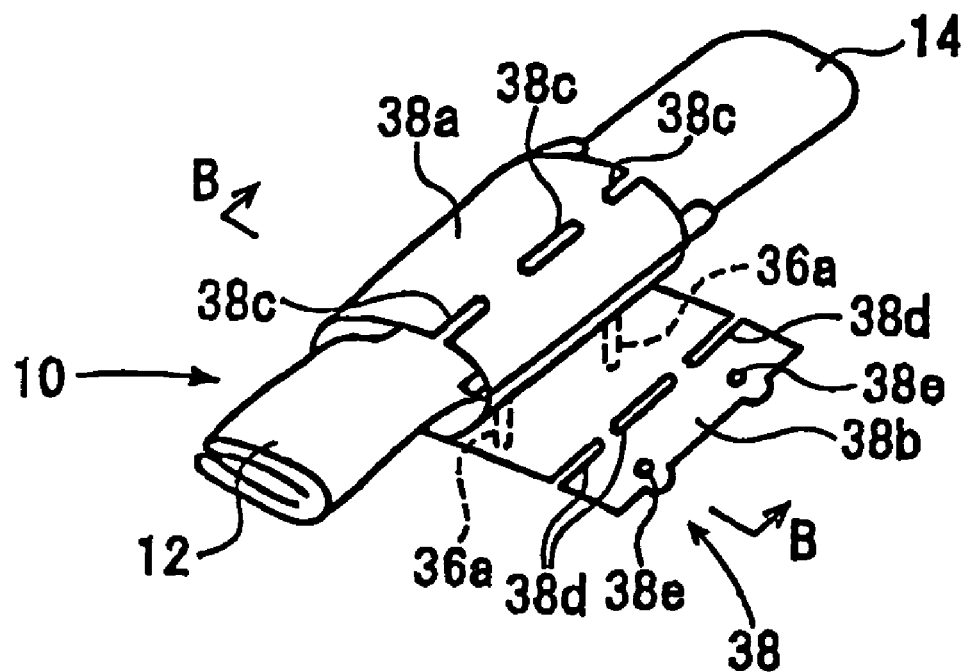
FIGS. 9(a) and 9(b) are explanatory drawings showing a folding procedure of the airbag apparatus shown in FIG. 1.
Figure 10A:
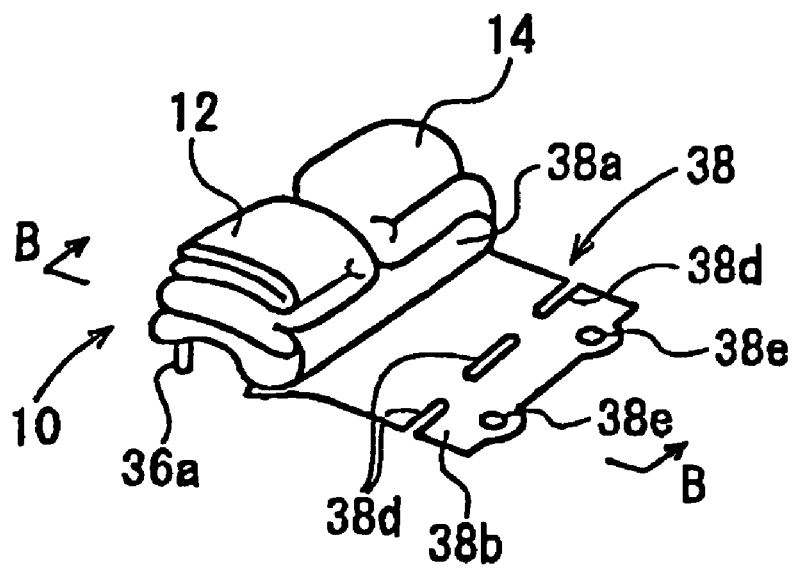
FIGS. 10(a) and 10(b) are explanatory drawings showing a folding procedure of the airbag apparatus shown in FIG. 1.
Figure 10B:
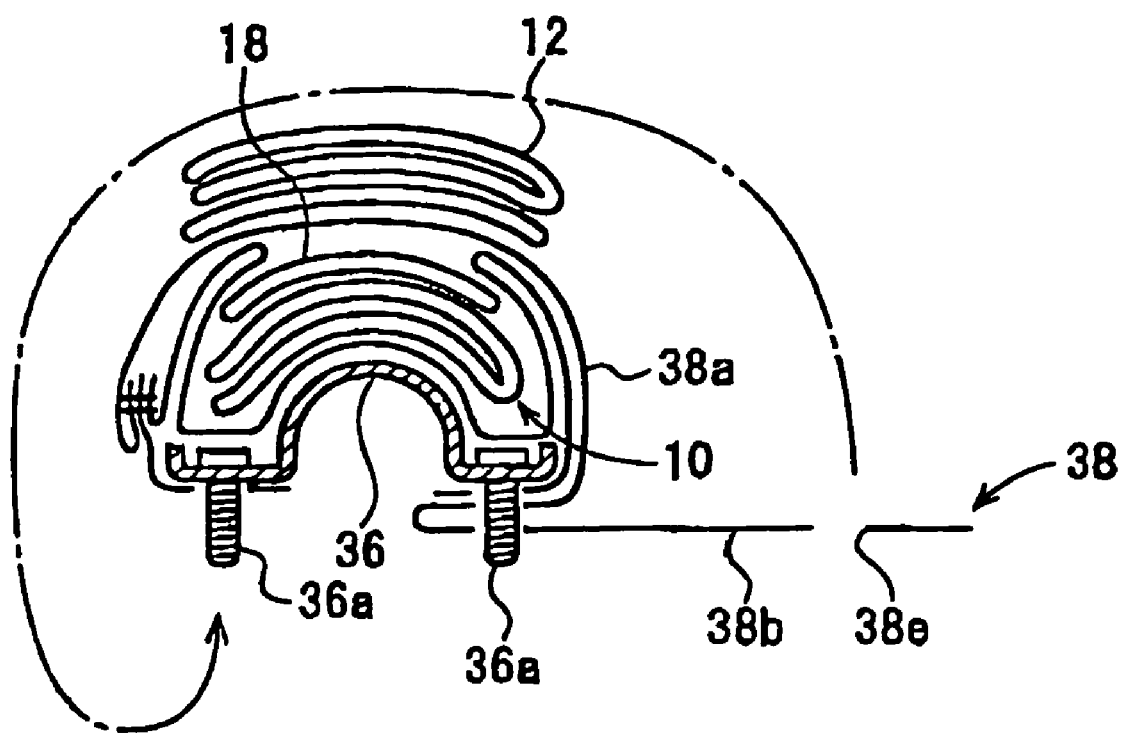
Figure 11A:
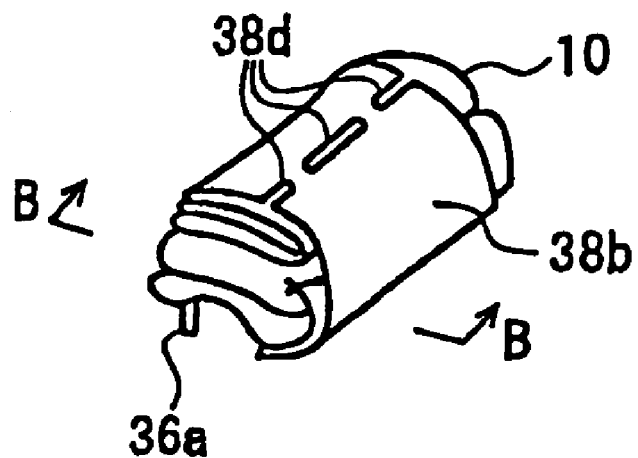
FIGS. 11(a) and 11(b) are explanatory drawings showing a folding procedure of the airbag apparatus show in FIG. 1.
Figure 11B:
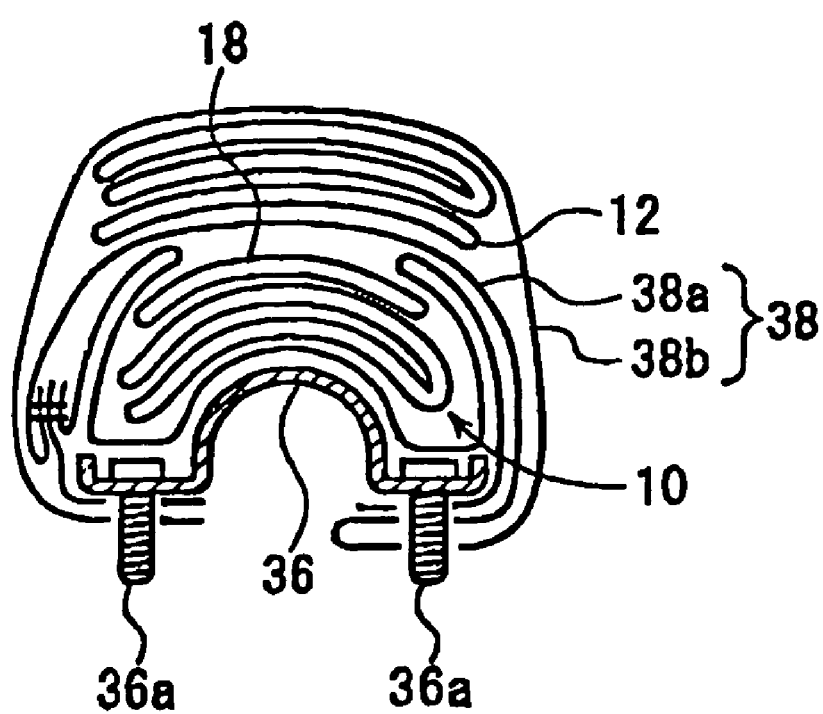

FIG. 1 is a perspective view of an airbag apparatus according to an embodiment and FIG. 2 is a horizontal cross-sectional view of the airbag apparatus. FIG. 3 to FIG. 7, FIG. 8(*a*), FIG. 9(*a*), FIG. 10(*a*), FIG. 11(*a*) are perspective views showing a folding procedure of the airbag in this airbag apparatus, FIG. 8(*b*), FIG. 9(*b*), FIG. 10(*b*), and FIG. 11(*b*) are cross-sectional views taken along the line B-Bs in FIG. 8(*a*), FIG. 9(*a*), FIG. 10(*a*), and FIG. 11(*a*), respectively. In the following description, the front (distal) side of the airbag designates the distal side in the direction of expansion of the airbag, and the rear (proximal) side designates the rear side in the direction of expansion of the airbag.

An airbag 10 includes a left airbag section 12 expanding on the left side in front of an occupant, a right airbag section 14 expanding on the right side in front of the occupant, and a communicating portion 16 for communicating one end of the left airbag section and the right airbag section with respect to each other. The communicating portion 16 resides on the proximal side of the airbag 10. The left airbag section 12 and the right airbag section 14 expand in the direction away from the communicating portion 16.

In a state in which the airbag 10 is expanded, a cross member such as a tie panel does not exist between the distal ends of the left airbag section 12 and the right airbag section 14, and a void space 13 (FIG. 2) formed between the distal ends of both bags 12, 14 is opened toward the occupant (that is, rightward in FIG. 2).

In a state in which the airbag 10 is completely expanded, the distance between the distal end of the left airbag section 12 and the distal end of the right airbag section 14 is preferably 150-450 mm, more specifically, 170-430 mm.

In the airbag 10, the opposing surfaces of the midsections of the left airbag section 12 and the right airbag section 14 in the direction of expansion are connected to each other by joint belts 18.

In this embodiment, in order to limit the lateral width of the left airbag section 12 and the right airbag section 14 in the expanded state, the tether belts (suspending belt) 20 for connecting the panels (the inside panels 22, 24 and the outside panels 28, 30 described later) constituting the left and right side surfaces respectively are provided.

In this embodiment, the joint belt 18 and the tether belts 20, 20 are disposed so as to be connected linearly in the lateral direction in a state in which the airbag 10 is expanded.

The shell of the airbag 10 includes six panels in total of; a left inside panel 22, a right inside panel 24, an intermediate panel 26 for connecting the proximal ends of the panels 22, 24, a left outside panel 28, a right outside panel 30, and a proximal panel 32. The reference sign S designates a seam joining the respective panels together.

The left inside panel 22 constitutes the inner surface of the left airbag section 12, and the right inside panel 24 constitutes the inner surface of the right airbag section 14. The intermediate panel 26 constitutes the inner most portion between the left airbag section 12 and the right airbag section 14. The left outside panel 28 constitutes the outer surface of the left airbag section 12, and the right outside panel 30 constitutes the outer surface of the right airbag section 14. Although not shown in the drawing, the outside panels 28, 30 are provided with vent holes for discharging gas in the left airbag section 12 and right airbag section 14 to the outside. The proximal panel 32 constitutes the outer shell of the communicating portion 16.

In this embodiment, two slits (not shown) are formed on a part which constitutes the bottom surface of the communicating portion 16 of the proximal panel 32, and the inflator 34 is arranged within the communicating portion 16 via the slits. The inflator 34 has a rod-shape in this embodiment, and is passed through the slits with the longitudinal direction thereof oriented in the direction of the width (lateral direction) of the vehicle. Reference numeral 36 designates a fixing plate for fixing the bottom surface of the communicating portion 16 and the inflator 34 on an airbag mounting surface of an airbag storage case (not shown).

As shown in the drawings in FIG. 8(a) to FIG. 11(b), the fixing plate 36 includes a C-shaped band portion (reference numeral is omitted) to cover the peripheral surface of the inflator 34 in the longitudinal direction, a flange portion (reference numeral is omitted) extended so as to extend along the bottom surface of the communication portion 16 (and the airbag mounting surface of the case) from both ends of the C-shaped band, and stud bolts 36a projecting downward from the respective flanges. The stud bolts 36a extend through the bottom surface of the communicating portion 16 outside the airbag, and the bottom surface of the communicating portion 16 and the inflator 34 are connected to the airbag mounting surface by fixing the fixing plate 36 to the airbag mounting surface of the case by the stud bolts 36a.

In this embodiment, a protector cloth for wrapping the folded body of the airbag 10 is connected to the rear end of the communicating portion 16. The protector cloth 38 is a band-shaped panel extending rearward from the rear end of the communication portion 16 in this embodiment, and includes a second folded body wrapping member 38a for wrapping the second folded body of the airbag 10 and a final folded body wrapping member 38b for wrapping the final folded body continuously formed. As clearly shown in FIG. 8(a) to FIG. 11(b), the proximal side of the protector cloth 38 in the extending direction from the communicating portion 16 corresponds to the second folded body wrapping member 38a, and the distal side corresponds to the final folded body wrapping member 38a.

The folded body wrapping members 38a, 38b are adapted to be broken when tension in excess of a predetermined strength is applied in the extending direction. More specifically, in this embodiment, the respective folded body wrapping members 38a, 38b is formed with slits 38c, 38d so as to extend in the direction intersecting the extending direction thereof in a state of perforated lines, and the folded body wrapping member 38a, 38b are adapted to be torn and broken along the respective slits 38c, 38d when tension in excess of a predetermined strength is applied on the respective folded body wrapping members 38a, 38b.

Bolt insertion holes 38e for inserting the stud bolts 36a of the fixing plate 36 are formed in the vicinity of the boundary between the folded body wrapping members 38a, 38b and along the distal edge of the folded body wrapping member 38b.

Although not shown in the drawings, the airbag apparatus is configured by folding and storing the airbag 10 in the case, and mounting the lid or a cover to cover the airbag 10. The lid or the cover is adapted to be pressed by the airbag 10 and torn when the airbag 10 is expanded. The airbag apparatus is installed in the instrument panel or the like in front of the passenger's seat of the motor vehicle.

Referring now to FIG. 3 to FIG. 11(b), a procedure of folding the airbag 10 will be described.

When folding the airbag 10, the left airbag section 12 and the right airbag section 14 are spread flatly so that the left and right side surfaces (the inside panels 22, 24 and the outside panels 28, 30) overlap with respect to each other. Then, as shown in FIG. 3 to FIG. 5, the left airbag section 12 and the right airbag section 14 are folded so as to reduce the vertical width to obtain an elongated first folded body.

Figure 3:
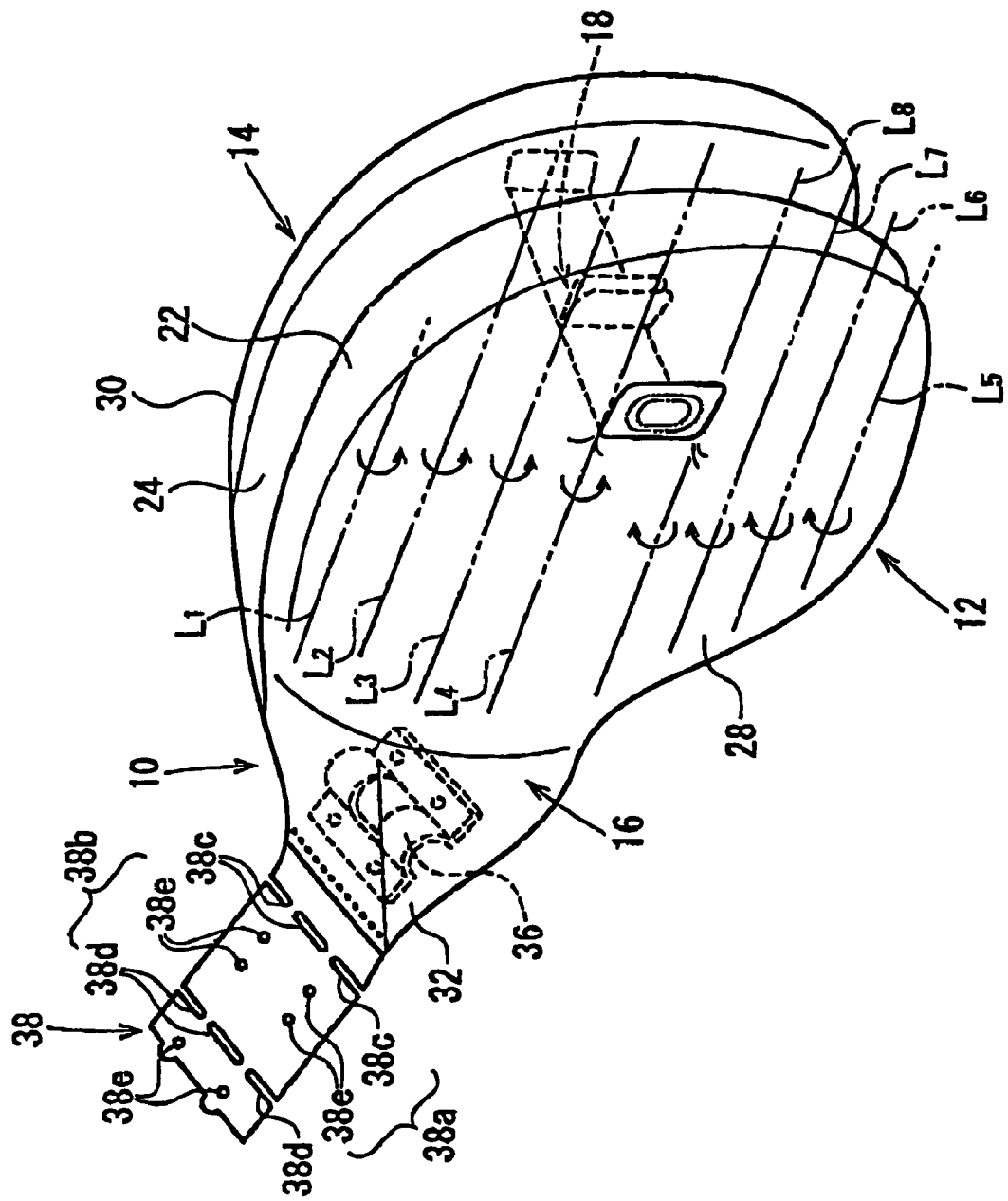
FIG. 3 is an explanatory drawing showing a folding procedure of the airbag apparatus shown in FIG. 1.
Figure 4:
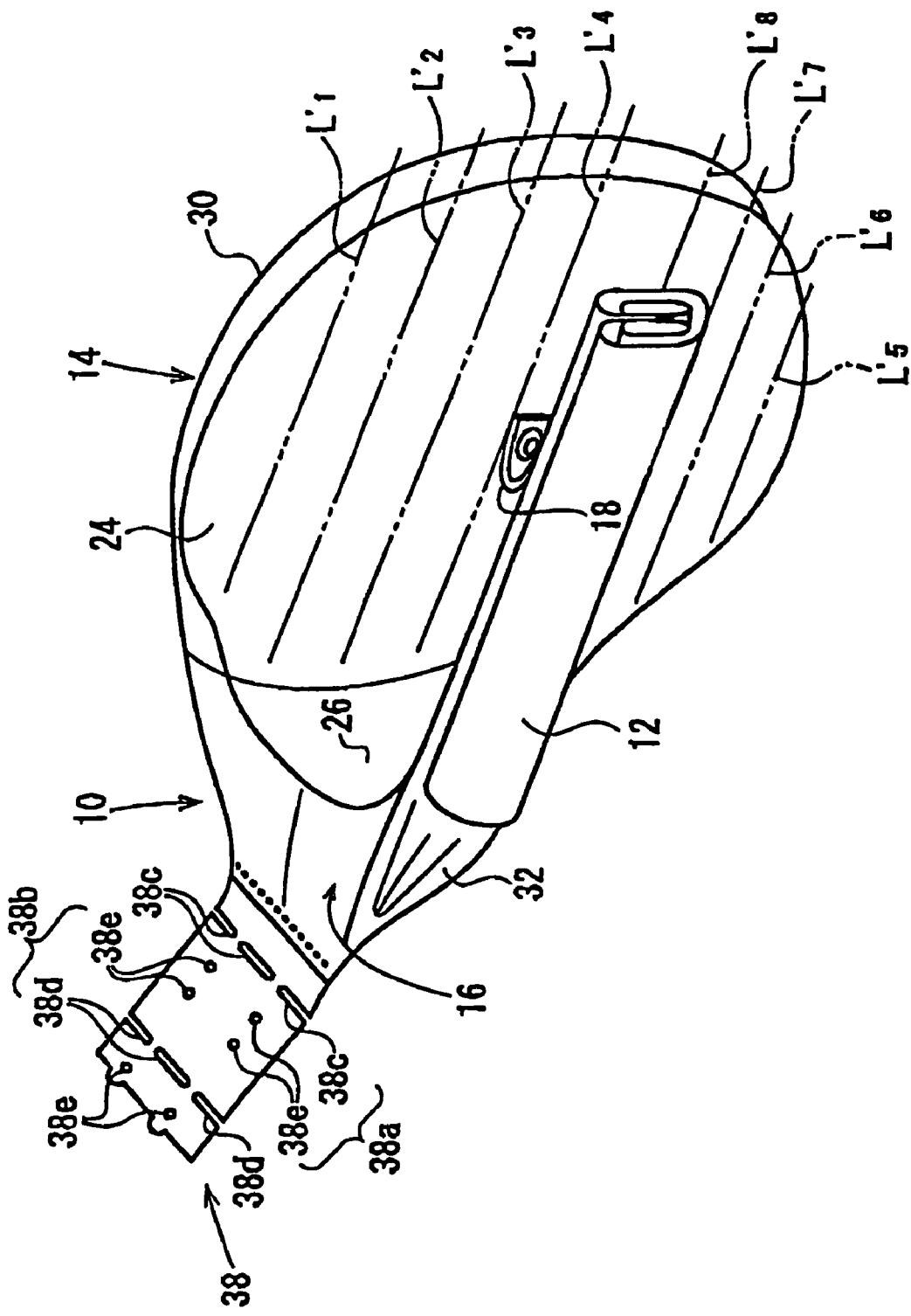
FIG. 4 is an explanatory drawing showing a folding procedure of the airbag apparatus shown in FIG. 1.

In this embodiment, in the first folding operation, as shown in FIG. 3 to FIG. 4, the left airbag section 12 is folded toward the outside panel 28 from the upper side until the joint belt 18 (joint portion between the left airbag section 12 and the right airbag section 14) downward by a predetermined width along the fore-and-aft folding lines $L_1$, $L_2$, . . . (folding lines up to $L_4$ are shown in FIG. 3) in sequence, so that a roll-shaped folded body (rolled body) elongated in the fore-and-aft direction is formed on the upper side. Subsequently, the left airbag section 12 is folded toward the outside panel 28 from the lower side until the joint belt 18 upward by a predetermined width along the fore-and-aft folding lines $L_5$, $L_6$, . . . (folding lines up to $L_8$ are shown in FIG. 3) in sequence, so that a roll-shaped body elongated in the fore-and-aft direction is formed on the lower side. Then, the lower rolled body is overlapped on the outside of the upper rolled body.

Figure 5:
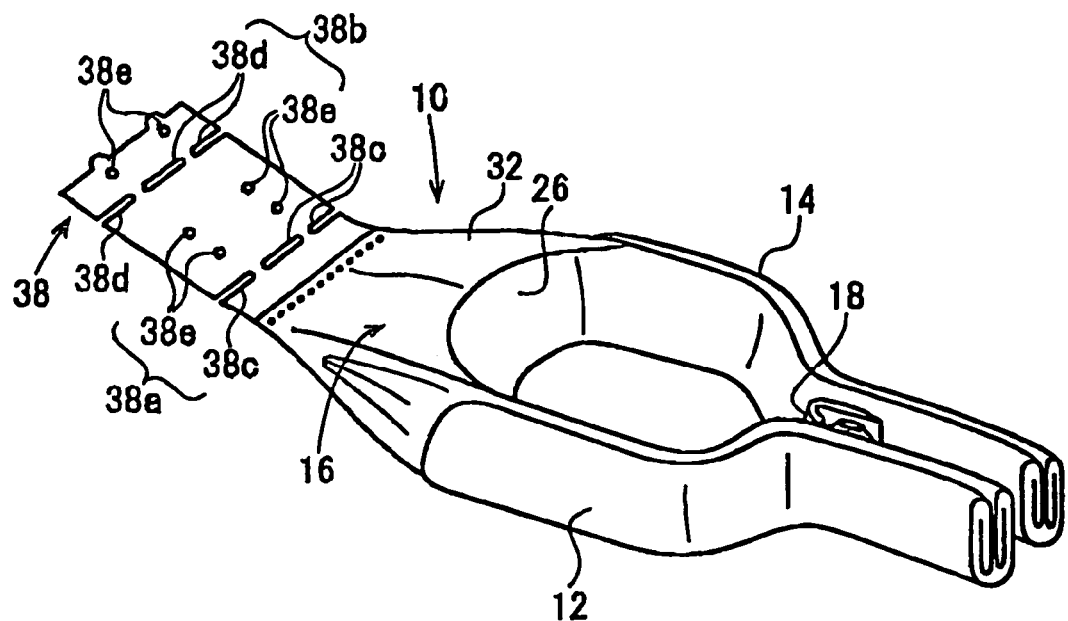
FIG. 5 is an explanatory drawing showing a folding procedure of the airbag apparatus shown in FIG. 1.

As shown in FIG. 4 to FIG. 5, the right airbag section 14 is folded toward the outside panel 30 from the upper side until the joint belt 18 downward by a predetermined width along the fore-and-aft folding lines $L_1'$, $L_2'$, . . . (folding lines up to $L_4'$ are shown in FIG. 4) in sequence, so that a roll-shaped folded body elongated in the fore-and-aft direction is formed on the upper side, and is folded toward the outside panel 30 from the lower side until the joint belt 18 upward by a predetermined width along the fore-and-aft folding line $L_5'$, $L_6'$, . . . (folding lines up to $L_8'$ are shown in FIG. 3) in sequence, so that a roll-shaped body elongated in the fore-and-aft direction is formed on the lower side. Then, the lower rolled body is overlapped on outside of the upper rolled body.

However, the first folding operation of the left airbag section 12 and the right airbag section 14 is not limited to rolling, but may be various folding methods such as accordion folding (zigzag folding), or may be a combination of a plurality of folding methods. Also, as described above, in addition to the method of folding the upper side and lower side of the left and right airbag sections separately, for example, a method of folding each airbag section into half along the portion around the joint belt 18 and folding in a state in which the upper side and the lower side are overlapped.

The vertical width of the first folded body of the left airbag section 12 and the right airbag section 14 is set according to the vertical width of the case for storing the airbag 10.

Figure 6:
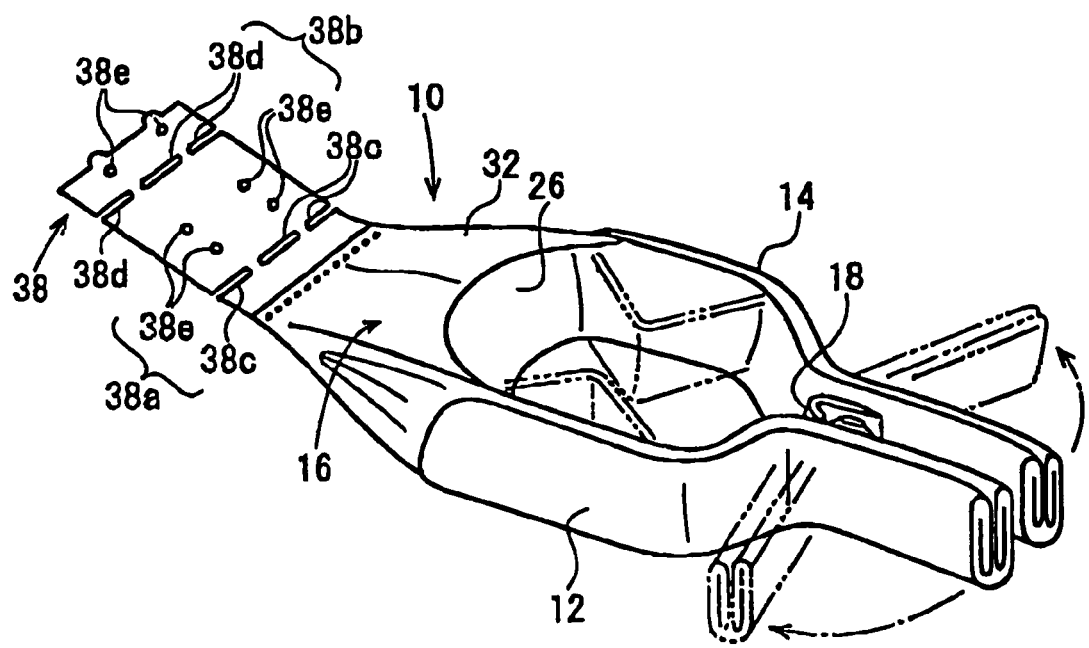
FIG. 6 is an explanatory drawing showing a folding procedure of the airbag apparatus shown in FIG. 1.
Figure 7:
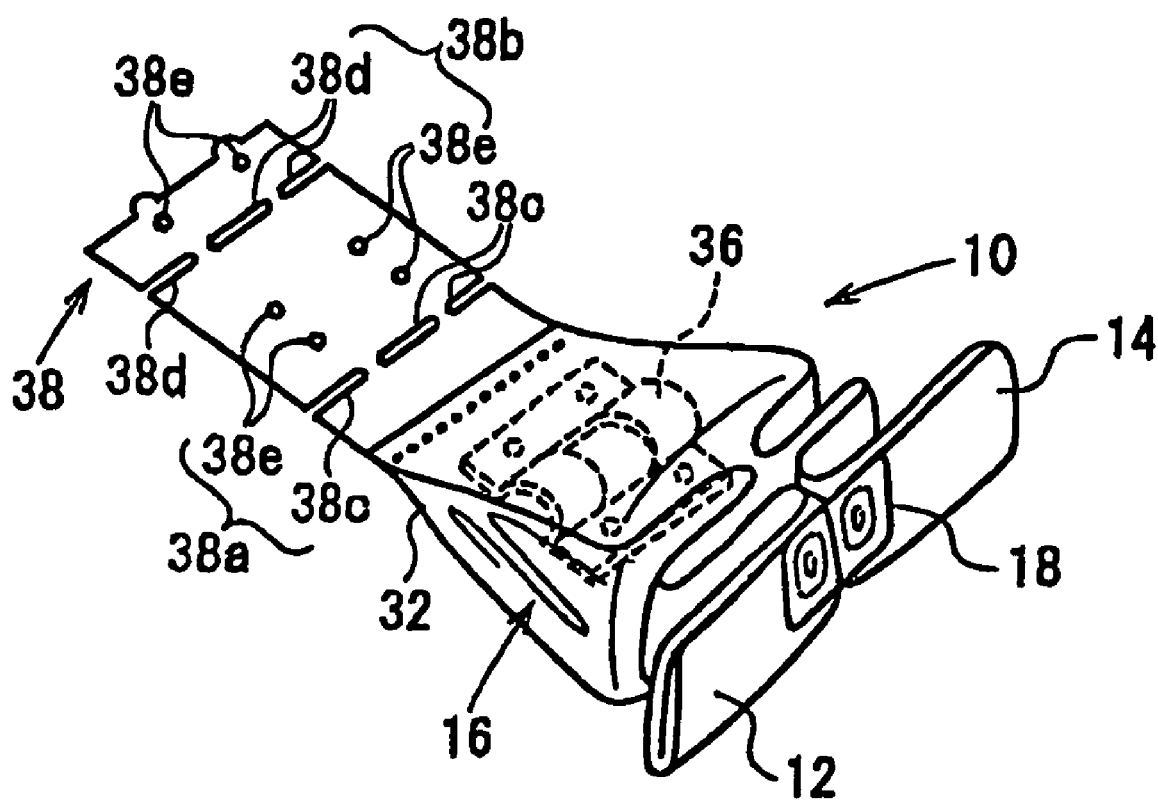
FIG. 7 is an explanatory drawing showing a folding procedure of the airbag apparatus shown in FIG. 1.

Subsequently, as shown in FIG. 6 to FIG. 7, the distal sides from the joint belt 18 of the first folded bodies of the left airbag section 12 and the right airbag section 14 elongated in the fore-and-aft direction are opened toward the left and right away from each other, and the rear sides thereof from the respective joint belts 18 are folded in an accordion shape (zigzag shape) so that the width in the fore-and-aft direction is reduced to obtain the second folded body shown in FIG. 7.

The method of folding the rear sides from the joint belt 18 of the left airbag section 12 and the right airbag section 14 may be a folding method other than the accordion shape.

Figure 8A:
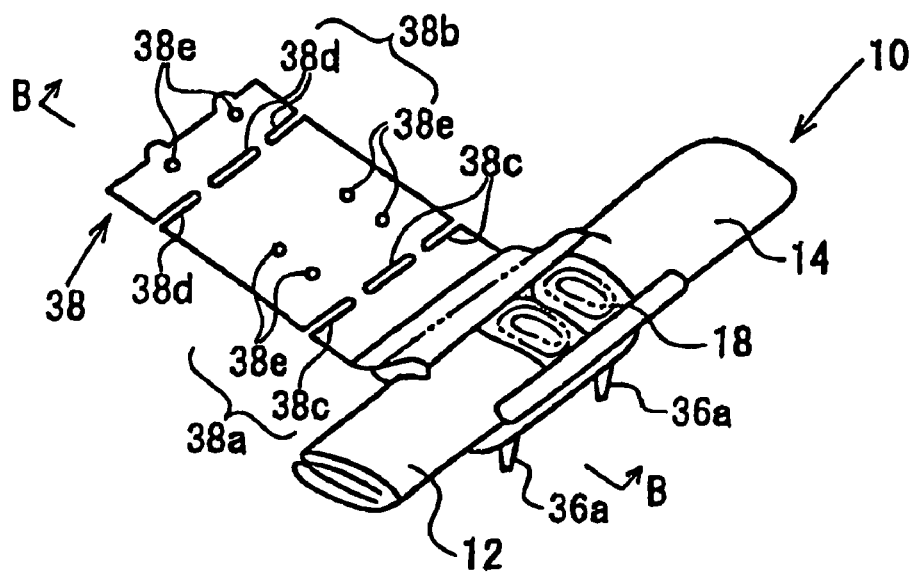
FIGS. 8(a) and 8(b) are explanatory drawings showing a folding procedure of the airbag apparatus shown in FIG. 1.
Figure 8B:
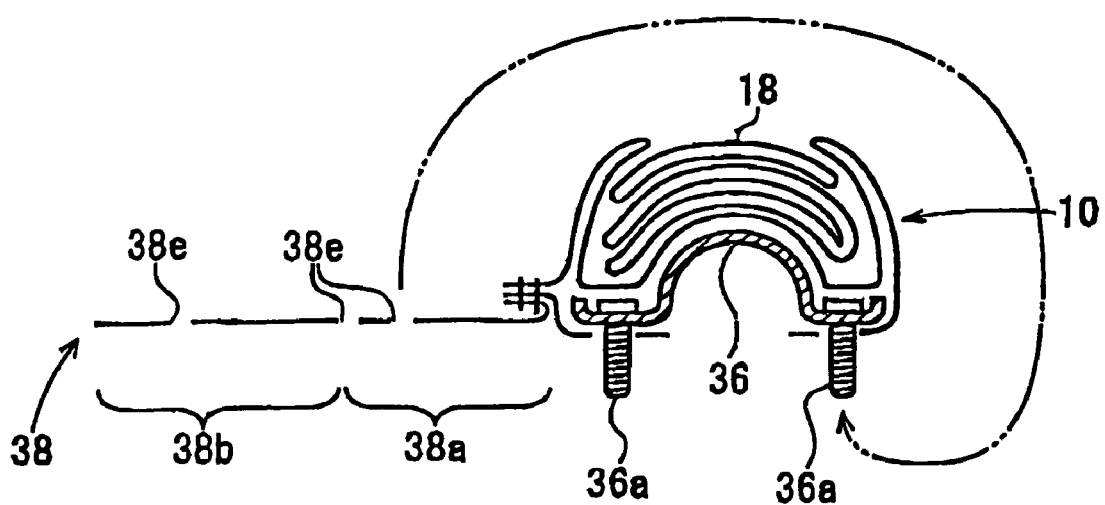

Subsequently, as shown in FIG. 7 to FIGS. 8(a) and 8(b), the communicating portion 16 is flattened as a board, and the second folded bodies of the left airbag section 12 and the right airbag section 14 are overlapped thereon. Accordingly, as shown in FIGS. 8(a) and 8(b), the communicating portion 16 and the second folded body are overlapped on the fixing plate 36.

Subsequently, as shown in FIG. 8(a) to FIG. 9(b), the second folded body wrapping member 38a of the protector cloth 38 connected to the rear end of the communicating portion 16 is turned from the rear end side of the communicating portion 16 so as to wrap around the second folded body.

Then, the stud bolts 36a of the fixing plate 36 extending from the bottom surface of the communicating portion 16 are inserted into the bolt inserting holes 38e in the vicinity of the boundary of the final folded body wrapping member 38b and the second folded body wrapping member 38a, and the distal end side of the secondary folded body wrapping member 38a is engaged with the stud bolts 36a. Accordingly, the second folded bodies of the left airbag section 12 and the right airbag section 14 are wrapped by the second folded body wrapping member 38a.

Figure 9B:
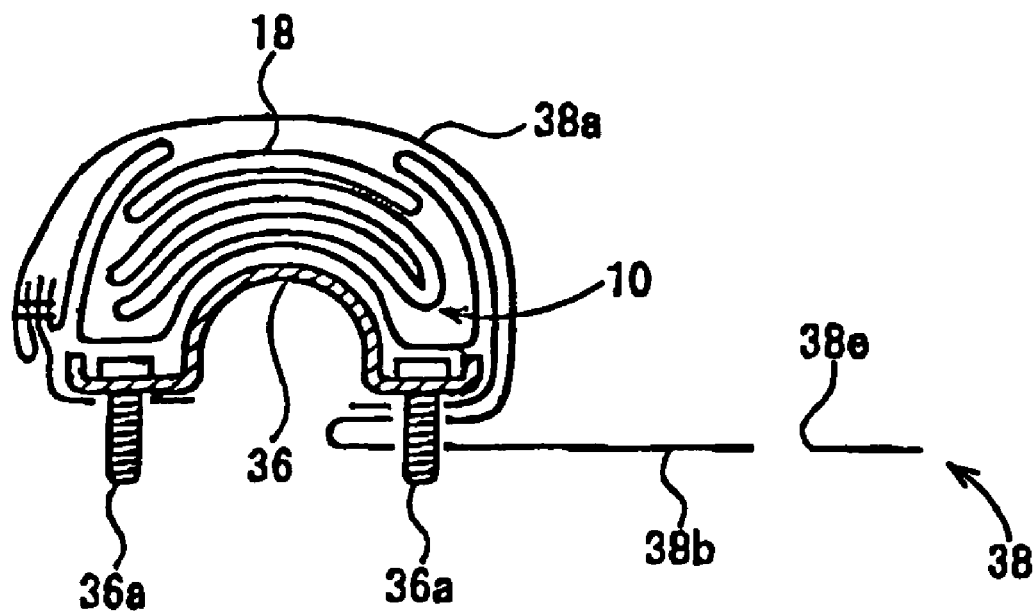

In this embodiment, bolt insertion holes 38e are provided in two rows at position shifted in the extending direction of the protector cloth 38 along the boundary section between the second folded body wrapping member 38a and the final folded body wrapping member 38b. As shown in FIG. 9(b), when engaging the second folded body wrapping member 38a with the stud bolts 36a, the stud bolts 36a are inserted into the bolt insertion holes 38e on the side of the secondary folded body wrapping member 38a first, then the final folded body wrapping member 38b is folded toward the second folded member wrapping member 38a, and then the stud bolts 36a are inserted into the bolt insertion holes 38e on the side of the final folded body wrapping member 38b.

Subsequently, as shown in FIG. 9(a) to FIG. 10(b), the portions (distal portions) of the left airbag section 12 and the right airbag section 14 of the second folded body extending sideward from the lateral width of the case are folded thirdly toward the lateral center of the second folded body to obtain the final folded body. As shown in FIG. 10(a), in this embodiment, the distal ends of the left airbag section 12 and the right airbag section 14 are folded respectively in accordion shape toward the lateral center of the second folded body. However, it may be folded in other various methods such as rolling.

Then, as shown in FIG. 10(a) to FIG. 11(b), the final folded body wrapping member 38b of the protector cloth 38 is turned toward the rear end side of the communicating portion 16 so as to wrap around the final folded body of the airbag 10, the stud bolts 36a extending from the bottom surface of the communication portion 16 are inserted into the bolt insertion holes 38e on the distal end side of the final folding body wrapping member 38b to engage the distal end side of the final folded body wrapping member 38b. Accordingly, the final folded body of the airbag 10 is wrapped by the final folded body wrapping member 38b.

In an embodiment, since the second folded body of the airbag 10 is wrapped by the second folded body wrapping member 38a of the protector cloth 38 after having folded the airbag 10 into the second folded body, the airbag 10 is retained in the second folded shape, and hence the subsequent final folding operation of the airbag 10 is facilitated.

Since the final folded body of the airbag 10 is wrapped by the final folded body wrapping member 38b of the protector cloth 38 after having folded the airbag 10 in the final fold (third folding operation), the airbag 10 is retained in the final folded shape and hence the mounting operation of the airbag 10 to the case is facilitated.

When a vehicle provided with the airbag apparatus thus constructed encounters an emergency state such as a collision, the inflator 34 starts gas-injection operation and hence gas is injected from the inflator 34 into the communicating portion 16. The gas from the inflator 34 flows from the communication portion 16 into the left airbag section 12 and the right airbag section 14, and the left airbag section 12 and the right airbag section 14 expand in front of the occupant on the left and right sides, respectively.

In an embodiment, when the airbag 10 starts expansion, the final folded body wrapping member 38b of the protector cloth 38 is broken along the slid 38d by the pressure of expansion of the airbag 10, whereby the final fold of the airbag 10 is released.

Since the distal sides of the left airbag section 12 and the right airbag section 14 of the airbag 10 are opened widely toward the left and right away from each other in the second folded state, when the final fold is released, the distal sides of the left airbag section 12 and the right airbag section 14 are deployed in the lateral direction in a relatively early stage. In particular, in this embodiment, the second folded body of the airbag 10 is wrapped by the second folded body wrapping member 38a of the protector cloth 38, and the expansion toward the front is limited. Therefore, the respective distal sides of the left airbag section 12 and the right airbag section 14 can be deployed smoothly in the lateral direction.

When the expansion of the airbag 10 makes progress, the second folded body wrapping member 38a is ruptured along the slit 38c by a pressure of expansion of the airbag (secondary folded body), whereby the second fold of the airbag 10 is released. Accordingly, the entire airbag 10 starts expanding toward the occupant.

Since the left airbag section 12 and the right airbag section 14 are deployed in the lateral direction in a relatively early stage, gas is supplied to both the left airbag section 12 and the right airbag section 14 substantially evenly, and hence the left airbag section and the right airbag section expand substantially evenly and smoothly from the relatively early stage. In addition, the surface which comes into contact with the occupant first (the first contact area) is formed widely in the lateral direction. Furthermore, in the initial stage of expansion, the left airbag section 12 and the right airbag section 14 are prevented from expanding excessively toward the occupant.

When the left airbag section 12 and the right airbag section 14 expand, the respective distal sides expand while turning from a state of being opened widely apart from each other and coming close to each other. Therefore, the left airbag section 12 approaches the occupant's left breast so as to wrap the left breast from the left front thereof, and the right airbag section 14 approaches the occupant's right breast so as to wrap the right breast from the right front thereof. Consequently, the occupant's head is received by both bags 12, 14 as if it is embraced from the front of the left and right sides.

Referring now to FIG. 12 to FIG. 18, the airbag apparatus according to another embodiment of the present invention and the method of folding an airbag will be described.

Figure 12:
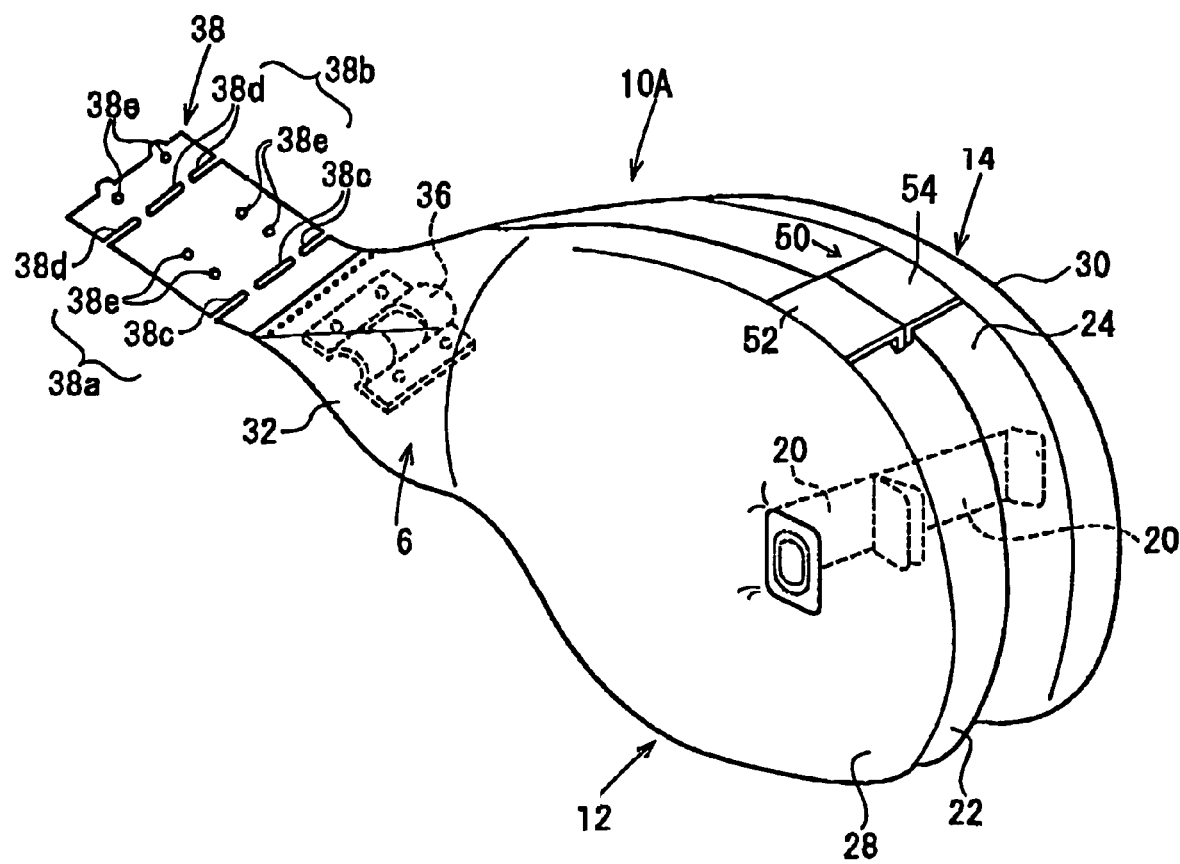
FIG. 12 is a perspective view of the airbag apparatus according to another embodiment when the airbag is expanded.
Figure 13:
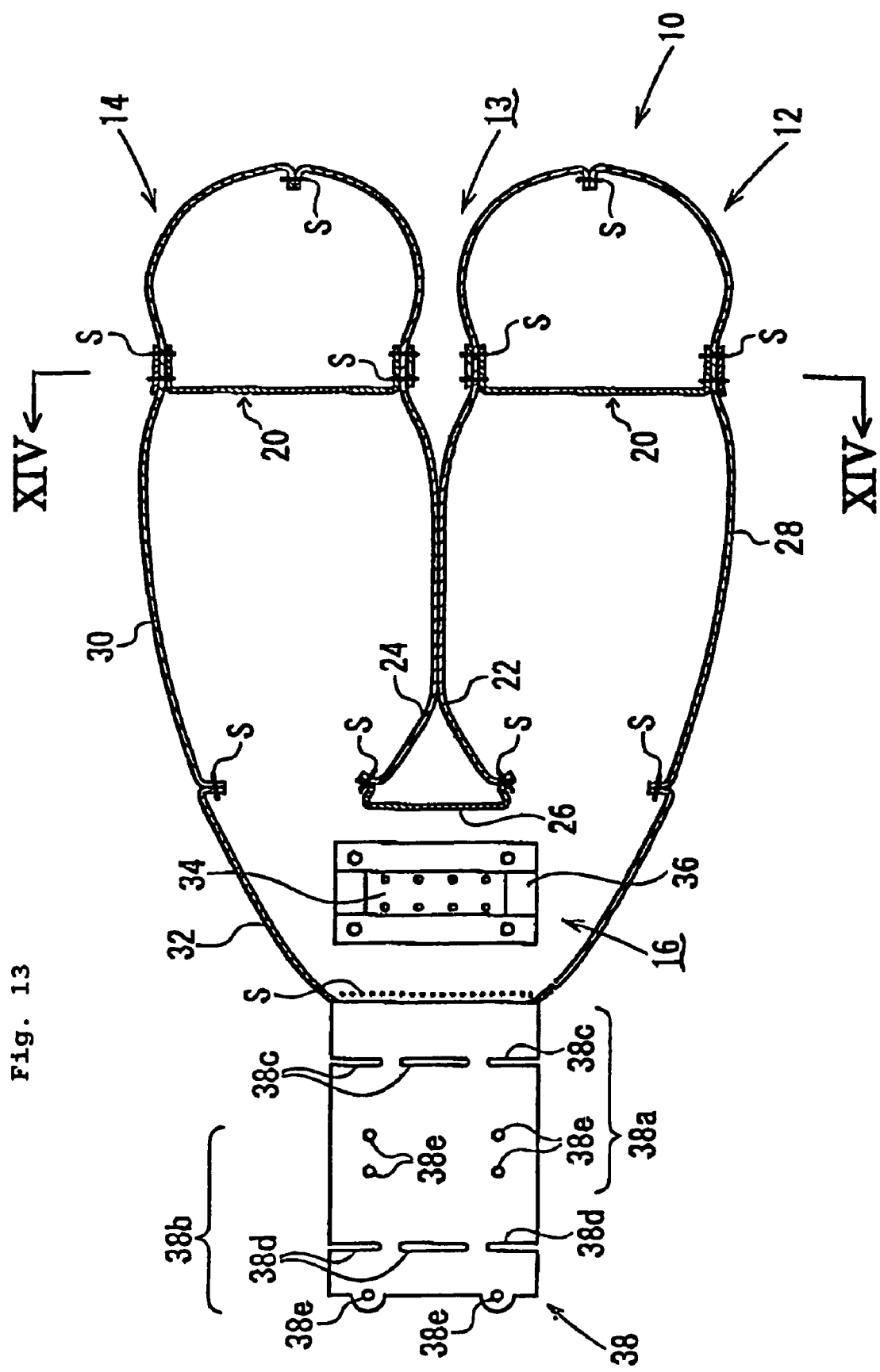
FIG. 13 is a horizontal cross-sectional view of the airbag of the airbag apparatus shown in FIG. 12.
Figure 14:
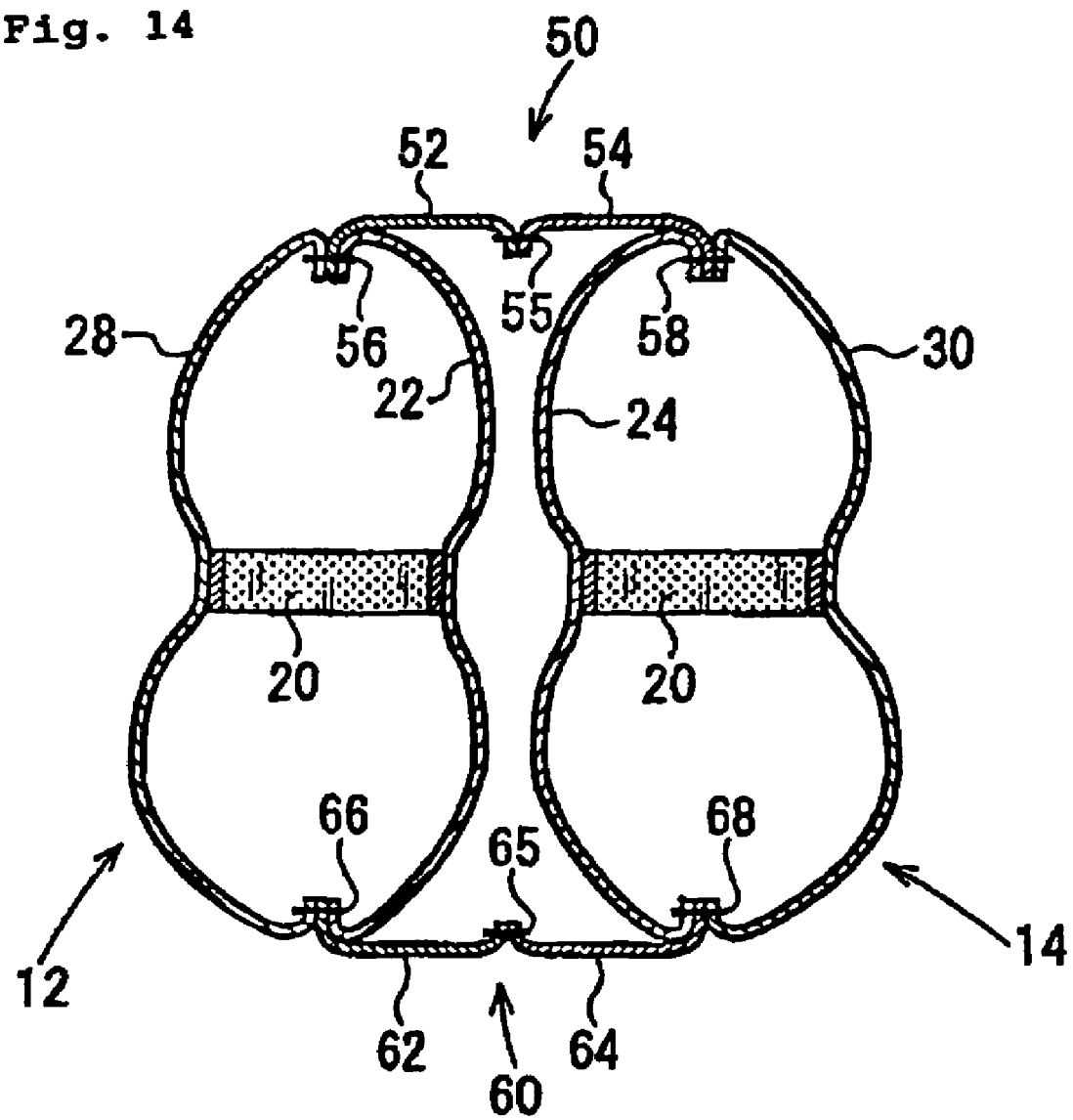
FIG. 14 is a cross-sectional view taken along the line XIV-XIV in FIG. 13.
Figure 15:
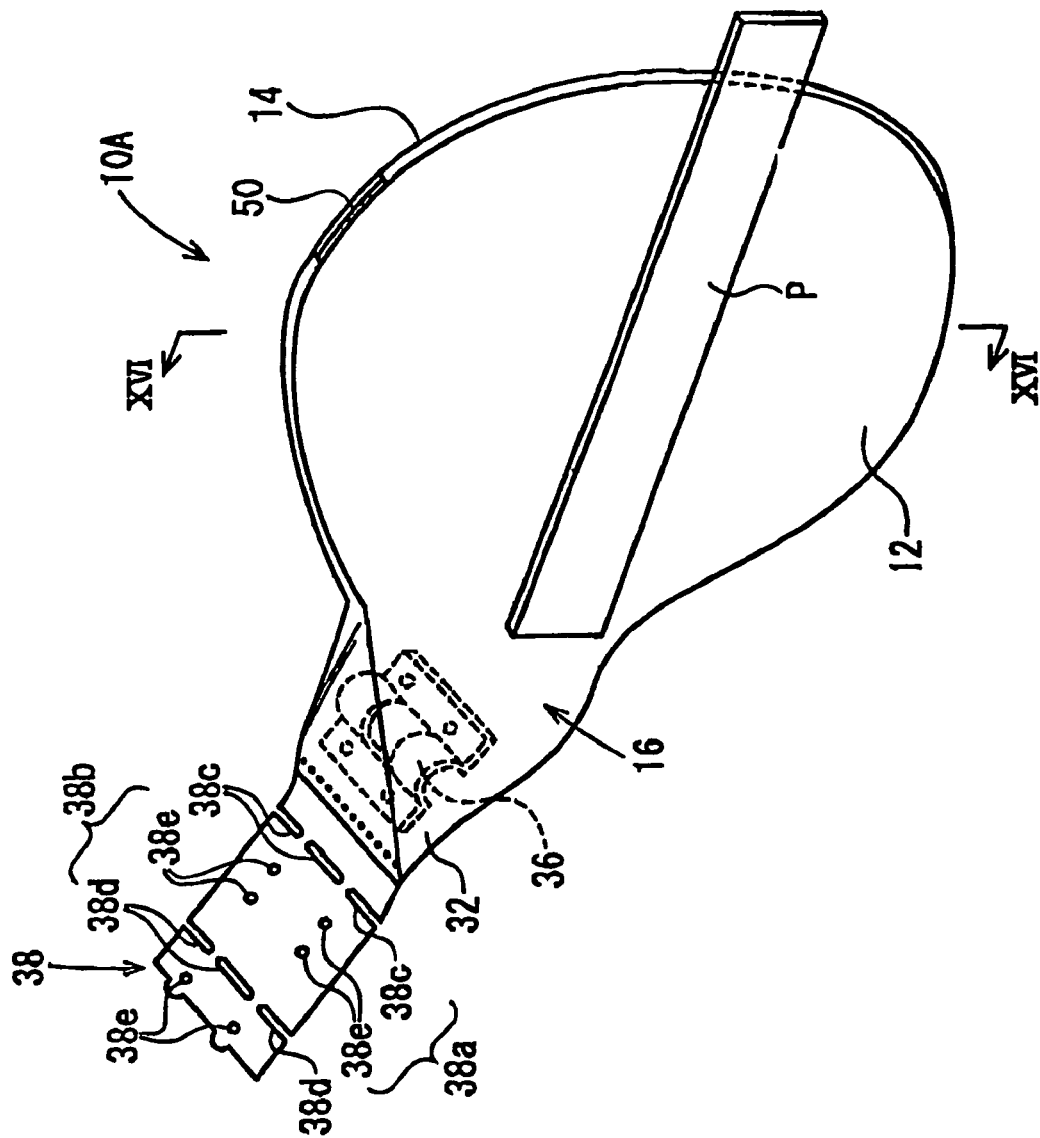
FIG. 15 is a perspective view explaining the folding method of the airbag.
Figure 16:
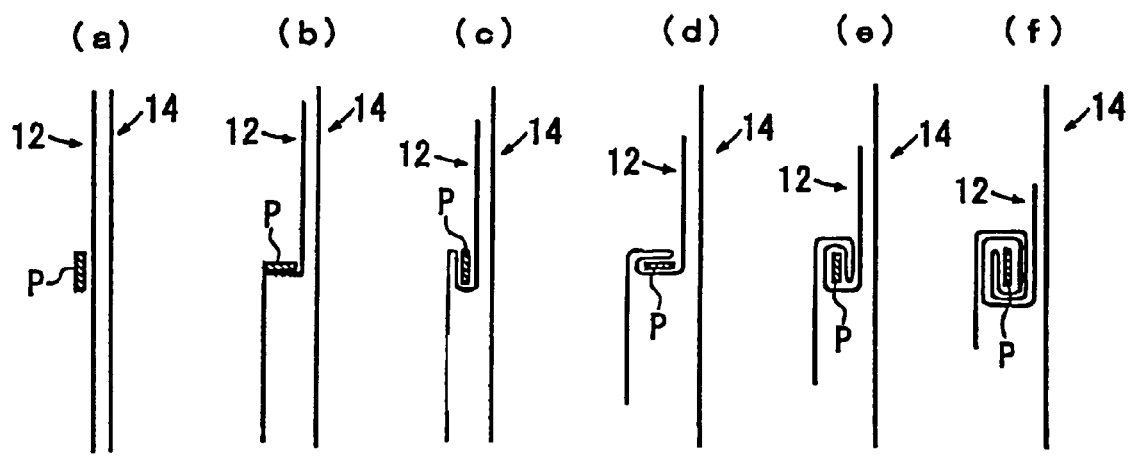
FIG. 16 is a cross-sectional view explaining the folding method of the airbag.
Figure 17:
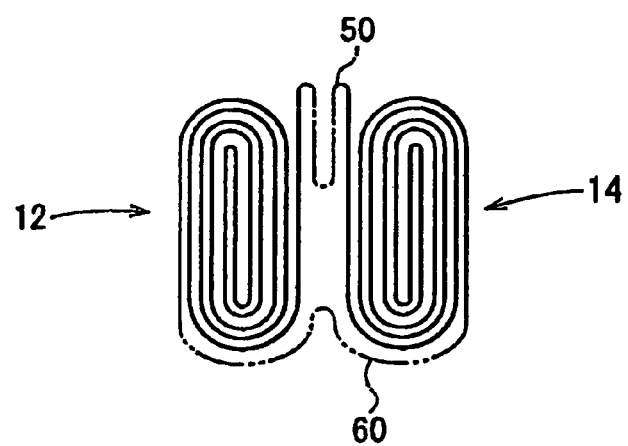
FIG. 17 is a cross-sectional view of the first folded body of the airbag.
Figure 18:
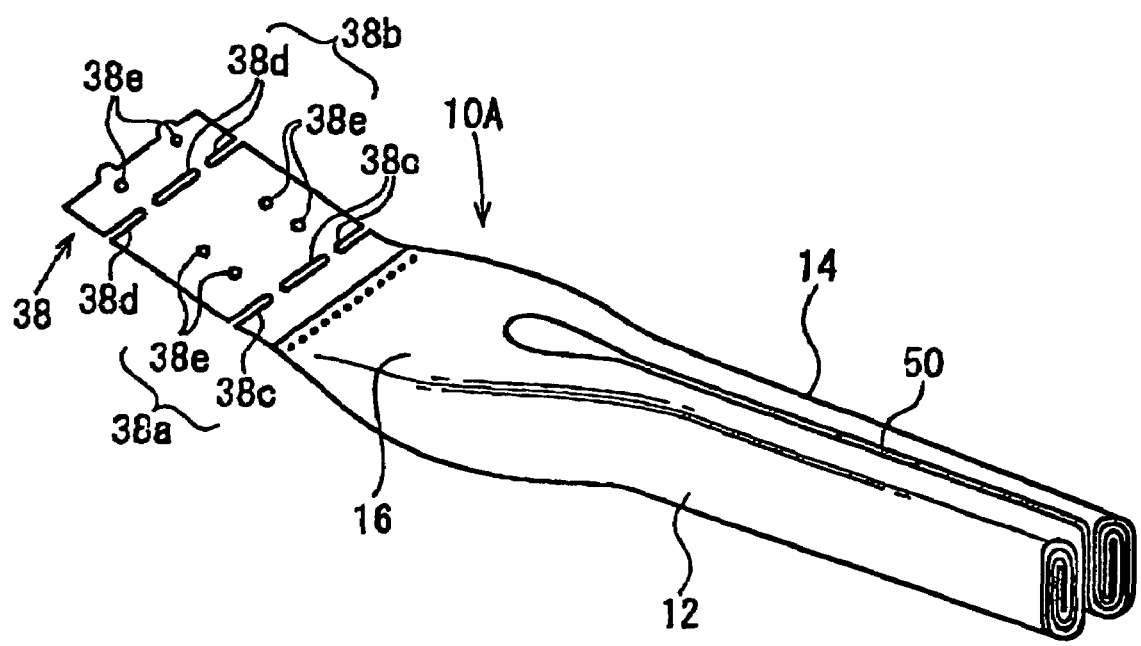
FIG. 18 is a perspective view of the first folded body of the airbag.

FIG. 12 is a perspective view of the airbag apparatus according to the embodiment when the airbag is expanded, and FIG. 13 is a horizontal cross-sectional view of the airbag of the airbag apparatus in FIG. 12. FIG. 14 is a cross-sectional view taken along the line XIV-XIV in FIG. 13; FIG. 15 is a perspective view explaining a method of folding an airbag; FIG. 16 is a cross-sectional view explaining the method of folding an airbag; FIG. 17 is a cross-sectional view of a first folded body of the airbag; and FIG. 18 is a perspective view of a first folded body of the airbag.

An airbag 10A employed in this embodiment has substantially the same structure as the airbag 10, and the different point is that the joint belt 18 is omitted, and the left airbag section 12 and the right airbag section 14 are connected by the connecting panels 50, 60 between the upper portions and between the lower portions, respectively.

The connecting panels 50, 60 are respectively formed of a pair of half panels 52, 54, and half panels 62, 64 connected by sewing threads 55, 65.

The left sides of the respective half panels 52, 62 are sandwiched between the upper sides and between the lower sides of the left inside panel 22 and the left outside panel 28, and are joined together by the sewing threads 56, 66.

The right sides of the respective half panels 54, 64 are sandwiched between the upper sides and between the lower sides of the right inside panel 24 and the right outside panel 30, and joined by the sewing strings 58, 68.

The positions of the connecting panels 50, 60 in the fore-and-aft direction are almost the same as the positions of the joint belts 18 of the airbag 10.

Other structures of the airbag 10A are the same as the airbag 10 as described above, and the same parts are represented by the same reference numerals.

Referring now to FIG. 15 to FIG. 18, the method of folding the airbag 10A into the first folded body will be described. FIG. 16(a) is a cross-sectional view taken along the line XVI-XVI in FIG. 15.

The left airbag section 12 and the right airbag section 14 are brought into a state of being deployed into a flat shape. A plate P for assisting the folding operation is placed on the outer side of the left airbag section 12 (the opposite surface opposing to the right airbag section 14). The plate P is narrow band shape extending in the fore-and-aft direction of the airbag 10A. The plate P is preferably as thin as 2 mm or less in thickness, and has rigidity to an extent that it resists bending during folding operation. The plate P preferably reaches from the point in the vicinity of the communicating portion 16 to the point in the vicinity of the distal end of the airbag 10A, or has a length longer.

The plate P is placed to the midpoint of the left airbag section 12 in the vertical direction so as to extend in the fore-and-aft direction (FIG. 15 and FIG. 16(a)).

Subsequently, as FIG. 16(b), (c), (d), (e) and (f), the left airbag section 12 is folded along the long side of the plate P so as to be wound around the outer periphery of the plate P.

In FIG. 16, the plate P is rotated clockwise, and the portion of the left airbag section 12 located above the plate P is wound thereon while being pulled downward on the right side of the plate P. The portion of the left airbag section 12 located below the plate P is wound thereon while being pulled upward on the left side of the plate P.

After having folded the entire left airbag section 12 so as to wind around the plate P, the plate P is pulled out. Also, the right airbag section 14 is folded so as to be wound around the plate P. The folding state of the right airbag section 14 is not shown but is symmetrical with the folding state of the left airbag section 12 shown in FIGS. 16(a) to (f).

The plate P is pulled out after having wound the entire right airbag section 14. Accordingly, the first folded body shown in FIG. 17 and FIG. 18 can be obtained. It is also possible to pull the plates P from the respective left airbag section 12 and the right airbag section 14 after having folded both the left airbag section 12 and the right airbag section 14.

The first folded body shown in FIG. 18 is proceeded to the second folding operation and the third folding operation according to the procedure shown in FIG. 5 to FIG. 11(b), and wrapped by the protector cloth 38.

The sequence of deployment of the airbag 10A in the airbag apparatus having the folded body of the airbag 10A has the same sequence of the airbag 10.

In the expanded airbag 10A, the left airbag section 12 and the right airbag section 14 are connected between the upper portions and between the lower portions by the connecting panels 50, 60, and the distance preferably from 150 to 450 mm, and more preferably on the order from 170 to 430 mm is formed between the distal ends of the bags 12, 14. Then, the left airbag section 12 receives the portion near the left breast of the occupant and the right airbag section 14 receives the portion near the right breast, and the occupant's head is received so as to be enwrapped by both bags 12, 14.

The embodiments described above are shown only for illustration and the invention is not limited to the above-described embodiments.

It is an object of the present invention to provide an airbag apparatus which receives an occupant's left breast by an expanded left airbag section, receives the occupant's right breast by an expanded right airbag section, a void space of the expanded airbag opposes to the lateral center of the occupant's breast, and both of the left airbag section and the right airbag section can be expanded smoothly and substantially evenly from the initial stage of expansion.

It is an object of the present invention to provide an airbag in which the left airbag section and the right airbag section can be expanded sufficiently quickly even when the capacity of the inflator is relatively small in an embodiment.

It is also an object of the present invention to provide a method for folding an airbag easily into an elongated shape.

The priority applications, Japanese Patent Application No. 2004-85330, filed Mar. 23, 2004 and Japanese Patent Application No. 2004-332105, filed Nov. 16, 2004, including the specification, drawings, claims and abstract, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag apparatus comprising:
   a folded airbag and an inflator configured to expand the airbag in which a distal side of the airbag is expanded in the direction away from a proximal side by injected gas from the inflator disposed on the proximal side of the airbag, the airbag including a left airbag section which expands on the left side in front of the occupant and a right airbag section which expands on the right side in front of the occupant, wherein the left airbag section and the right airbag section are not connected at distal ends thereof, thereby defining a void space which is opened toward the occupant between the distal ends of the left airbag section and the right airbag section in the expanded state, in that the midsection of the left airbag section and the right airbag section in the direction of expansion are connected, and in that the left airbag section and the right airbag section are respectively formed into a first folded body elongated in the fore-and-aft direction by a first folding step, then into a second folded body by the steps of moving portions of the left airbag section and the right airbag section on the distal sides from a joint portion away from each other and folding rear sides from the joint portion so as to be narrowed in width in the for-and-aft direction, and subsequently, into a final folded body by reducing the lateral width by a third folding step.

2. An airbag apparatus according to claim 1, wherein the midsections of the left airbag section and the right airbag section in the vertical direction are connected to each other.

3. An airbag apparatus according to claim 1, wherein the upper portions and the lower portions of the left airbag section and the right airbag section are connected respectively.

4. An airbag apparatus according to claim 1, wherein part of the second folded body is wrapped by a protector cloth.

5. An airbag apparatus according to claim 1, wherein part of the final folded body is wrapped by a protector cloth.

6. An airbag apparatus according to claim 5, wherein the protector cloth that wraps the second folded body and the protector cloth that wraps the final folded body are continuously formed.

7. An airbag apparatus according to claim 1, wherein suspending belts are extended between panels constituting right and left walls of the respective left airbag section and right airbag section for limiting the lateral widths in the expanded state.

* * * * *